Oct. 27, 1953
C. P. WHITLOCK
2,657,012
GARDEN HOSE STAKE
Filed Aug. 15, 1951
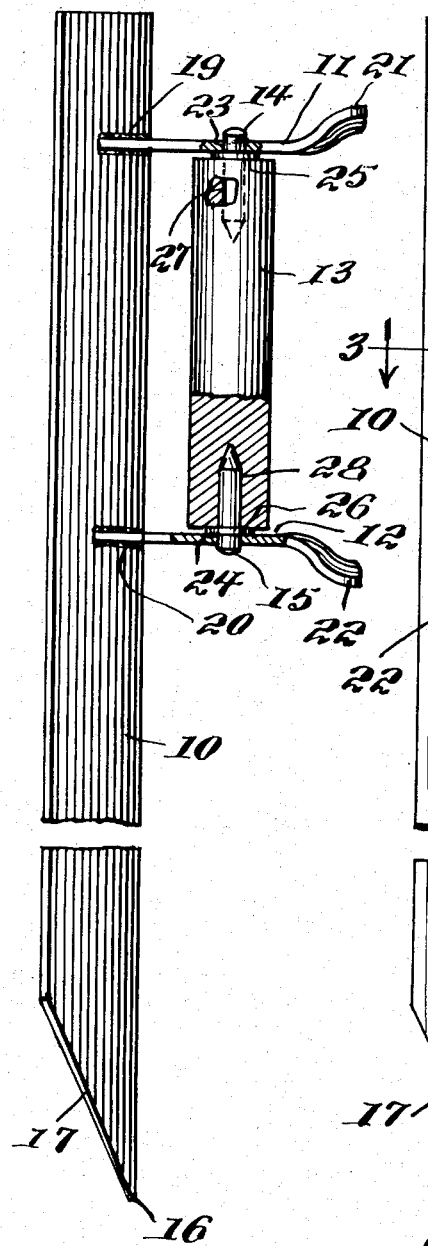
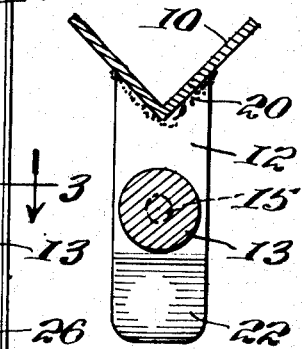
INVENTOR.
Charles P. Whitlock,
BY Victor J. Evans & Co.
ATTORNEYS Patented Oct. 27, 1953

2,657,012

UNITED STATES PATENT OFFICE 2,657,012

GARDEN HOSE STAKE

Charles P. Whitlock, Medford, Oreg.

Application August 15, 1951, Serial No. 241,993

2 Claims. (Cl. 254—190)

This invention relates to protecting stakes used at the corners of residences, in gardens and flower beds for preventing garden hose breaking plants and also for preventing the hose from sliding over sharp corners of a foundation wall, and in particular a stake having a roller journaled between arms extended outwardly therefrom and in which the arms are provided with outwardly flared ends.

The purpose of this invention is to provide a stake that may readily be driven into the ground for preventing damage caused by a garden hose being drawn over plants or against the corner of a building.

Various types of protecting stakes have been used in gardens, flower beds, and the like, however, with the conventional type of stake it is necessary to slide a garden hose over the stake and the sliding action damages the hose. With this thought in mind this invention contemplates a stake adapted to be used to protect plants from a garden hose and also the garden hose from the corner of a building in which a roller is journaled between horizontally disposed arms extended from the stake so that the hose may be drawn over a traveling surface instead of a stationary surface or sharp corner.

The object of this invention is, therefore, to provide means for forming a garden stake whereby a roller may be journaled therein so that a garden hose may be trained over the roller to prevent damaging plants and to reduce wear on the hose to minimum.

Another object of the invention is to provide a hose protecting stake for gardens and the like that may be removed and used in different positions.

A further object of the invention is to provide a garden stake having a roller journaled in outwardly extended arms thereon which is of a simple and economical construction.

With these and other objects and advantages in view the invention embodies a stake formed of angle iron with spaced horizontally disposed arms having outwardly flared ends secured, preferably by welding, to the outer corner thereof, and a roller positioned between and journaled in said arms.

Other features and advantages of the invention will appear from the following description taken in connection with the drawings wherein:

Figure 1 is a side elevational view illustrating the improved garden stake with parts broken away and shown in section.

Figure 2 is a front elevational view of the stake also with parts broken away.

Figure 3 is a sectional plan through the stake taken on line 3—3 of Figure 2.

Figure 4 is a detail on a reduced scale illustrating the use of the stake and showing a garden hose extended over a roller carried by the stake.

Referring now to the drawings wherein like reference characters denote corresponding parts the improved garden stake of this invention includes a piece of angle iron 10, horizontally disposed arms 11 and 12 and a roller 13 positioned between the arms and rotatably mounted in the arms by pins 14 and 15.

The lower end of the angle iron 10 is provided with a point 16 and beveled edges 17 and 18 extend from the point.

The arm 11 is secured to the angle iron 10 at the point 19 preferably by welding and the arm 12 is secured to the angle iron at the point 20 also preferably by welding.

The arm 11 is provided with an upwardly flared arcuate end 21 and the arm 12 is provided with a similar end 22.

The arm 21 is provided with an opening 23 in which the head of the pin 14 is positioned and the arm 12 is provided with a similar opening 24 in which the head of the pin 15 is positioned. The pin 14 is provided with a flange 25 that rests against the arm 11 and the pin 15 is provided with a similar flange 26 that is positioned between the end of the roller 13 and the arm 12.

The roller 13 is provided with sockets 27 and 28 and the ends of the pins 14 and 15 extend into the sockets, as illustrated in Figure 1.

As illustrated in Figure 4 the stake 10 is driven into the ground, which is indicated by the numeral 29 and with the stake in position garden hose 30 is positioned against the roller 13 and as the hose is drawn over the stake the roller is rotated by the hose whereby the hose engages a traveling surface.

The stake may be combined with a conventional hose carriage and may be moved from place to place as the hose is used over a garden, lawn, or the like.

It will be understood that modifications may be made in the design and arrangement of the parts without departing from the spirit of the invention.

What is claimed is:

1. A garden hose protector comprising a piece of angle iron having a point on one end with spaced horizontally disposed arms having outwardly flared arcuate ends extended from the upper part thereof, said arms having vertically aligned openings therein, pins with flanges thereon positioned in the openings of the arms, and a roller with sockets in the ends positioned between the arms with the ends of the pins extended into said sockets.

2. In a garden stake, the combination which comprises an angle iron post having angularly disposed webs with a point on the lower end and having spaced horizontally positioned arms with outwardly flared arcuate ends extended from the upper part thereof, said arms positioned in a vertical plane bi-secting the angle between the webs of the angle iron and the uppermost of the said arms spaced from the upper end of the stake, said arms having aligned openings in the intermediate parts thereof, pins with flanges spaced from the ends positioned in the openings of the arms, and a roller with sockets in the ends positioned between the arms and with the said pins extended into the sockets in the ends thereof.

CHARLES P. WHITLOCK.

References Cited in the file of this patent

UNITED STATES PATENTS

| Number | Name | Date |
| --- | --- | --- |
| 210,402 | Cain | Dec. 3, 1878 |
| 714,628 | Wright | Nov. 25, 1902 |
| 1,086,354 | Dysinger | Feb. 10, 1914 |
| 1,435,786 | Algea | Nov. 14, 1922 |
| 2,255,530 | Pittman et al. | Sept. 9, 1941 |